(12) United States Patent
Munteanu et al.

(10) Patent No.: US 7,041,330 B2
(45) Date of Patent: May 9, 2006

(54) ACTIVE STEEL REPASSIVATOR FOR CORRODED STEEL IN CHLORIDE CONTAMINATED REINFORCED CONCRETE STRUCTURES

(75) Inventors: Violeta F. Munteanu, Alliance, OH (US); Frederick D. Kinney, Broadview Heights, OH (US)

(73) Assignee: Tomahawk, Inc., Wilmington, DE (US)

( * ) Notice: Subject to any disclaimer, the term of this patent is extended or adjusted under 35 U.S.C. 154(b) by 166 days.

(21) Appl. No.: 10/837,726

(22) Filed: May 3, 2004

(65) Prior Publication Data

US 2004/0202775 A1    Oct. 14, 2004

Related U.S. Application Data

(62) Division of application No. 09/950,228, filed on Sep. 10, 2001, now Pat. No. 6,740,150.

(51) Int. Cl.
*B05D 1/00*  (2006.01)
(52) U.S. Cl. .................. 427/8; 106/14.13; 106/14.15; 106/14.16; 252/389.54
(58) Field of Classification Search ............... None
See application file for complete search history.

(56) References Cited

U.S. PATENT DOCUMENTS

| | | | | |
|---|---|---|---|---|
| 3,808,140 A | * | 4/1974 | Mago et al. | 252/389.54 |
| 4,372,873 A | * | 2/1983 | Nieh | 252/389.54 |
| 4,502,979 A | * | 3/1985 | McCullough et al. | 252/389.1 |
| 5,037,478 A | * | 8/1991 | Okai et al. | 106/479 |
| 5,250,325 A | * | 10/1993 | Phillips et al. | 427/386 |
| 6,048,413 A | * | 4/2000 | Park et al. | 148/325 |
| 6,077,885 A | * | 6/2000 | Hager et al. | 523/445 |

FOREIGN PATENT DOCUMENTS

EP            245961 A1  *  11/1987

* cited by examiner

*Primary Examiner*—Matthew A. Thexton
(74) *Attorney, Agent, or Firm*—James A. Hudak

(57) ABSTRACT

An active steel repassivator for the rehabilitation of chloride contaminated reinforced concrete structures and a method for the application of same is disclosed. The active steel repassivator is comprised of a continuous phase, a distributed phase, and/or an aqueous solution of an amine. The continuous phase, also known as the carrier phase, is selected from organic strong volatile bases, salts of weak volatile acids and a non-ionic surfactant. The distributed phase includes an anion containing vanadium in the +4 or +5 state of oxidation. The aqueous solution of the amine acts as a co-inhibitor in the composition.

5 Claims, 2 Drawing Sheets

ACTIVE STEEL REPASSIVATOR FOR CORRODED STEEL IN CHLORIDE CONTAMINATED REINFORCED CONCRETE STRUCTURES

This application is a division of application Ser. No. 09/950,228, filed Sep. 10, 2001, now U.S. Pat. No. 6,740,150.

TECHNICAL FIELD

The present invention relates, in general, to the rehabilitation of chloride contaminated reinforced concrete structures and, more particularly, to a method for rehabilitating chloride contaminated reinforced concrete structures and a new class of materials to accomplish same.

BACKGROUND ART

Steel reinforcing rods contained within concrete are protected against corrosion by the alkalinity of the cement within the concrete. The cement contains alkali, alkali earth, metal oxides and hydroxides that typically result in concrete having a pH of between 12 and 14 depending upon the source of the cement and its age. In a highly alkaline environment, the steel reinforcing rods are passivated by the formation of a surface oxide film that protects the steel from corrosion. This protective oxide film is relatively stable at pH values greater than approximately 9.5 in a chloride free environment. The pH value required to stabilize the protective oxide film increases as the chloride content within the concrete increases. If this protective film is broken, corrosion can commence on the steel reinforcing rods. This may occur as a result of the ingress of sufficient chlorides into the concrete matrix to initiate corrosion. The chlorides may originate from the use of deicing salts, exposure to a marine environment, or through the use of a concrete admixture that contains chlorides. Alternatively, or in combination with the ingress of sufficient chlorides, carbonation of the concrete can occur. Carbonation, which is the reaction of CO and $CO_2$ in the air with available alkali in the concrete, causes the pH of the concrete to decrease over time. Once the pH of the concrete is below 9.5, the protective oxide film starts to break down resulting in the commencement of corrosion of the steel reinforcing rods and the deterioration of the concrete structure. The deterioration of such structures has become a concern in the concrete industry. This concern has become so important that the issue of concrete durability has replaced the issue of concrete strength as the most pressing problem facing the concrete industry.

The objective of any type of concrete repair is for the repair to be relatively low in cost and durable in nature. In addition, variations in the repair should be limited and predictable over time and the repair should not deteriorate over time. Typically, there are two approaches to rehabilitate chloride contaminated reinforced concrete. One approach is to remove the damaged concrete and replace it with patch materials. Another approach is to utilize electrochemical means to minimize or eliminate future corrosion of the steel reinforcing rods within the concrete. Electrochemical chloride extraction typically involves the application of relatively high direct electrical currents to the concrete over a period of 10 to 50 days. The objective of this approach is to remove 20–50% of the chlorides from the concrete. Cathodic protection involves the passage of a small direct electrical current through the concrete. The objective of this latter approach is to reduce the rate of reinforcing rod corrosion to very low levels that are not of engineering significance.

To apply an electrical current to the concrete, an anode is attached to the concrete and a voltage is applied between the anode and the steel reinforcing rods causing a direct current to flow through the concrete. If the voltage originates from the natural difference in the potentials of the anode and the steel reinforcing rods, the foregoing system is known as a galvanic system. An alternate approach, known as the impressed current system, utilizes a rectifier to provide the voltage for the resulting direct current system. With the cathodic protection approach, it is generally assumed that the protective current must be continually provided to the steel reinforcing rods.

In existing steel reinforced concrete structures, the deterioration process of the reinforcing rods can reach different stages depending on the age of the structure, the exposure conditions, any cover provided for the concrete, and the overall quality of the structure. If a corrosion situation is possible or at the onset of corrosion, preventive measures may be initiated. In contrast, in severely corroded steel reinforced concrete structures, repairs to the structures must be performed. Some producers of rehabilitation materials have asserted that their materials can stop or delay the initiation of corrosion on the steel reinforcing rods within the concrete. Typically, such materials must be applied to the concrete surface. Many of these materials can be classified as migration corrosion inhibitors. Application of such materials to the concrete surface requires that the material penetrates through the concrete to reach the steel reinforcing rods and that the material be of sufficiently high concentration to reduce the corrosion rate of the rods. According to technical literature and information, different classes of materials have been considered to be corrosion inhibitors. Typically, such materials are organic amines (hydroxylamines, hydroxyalkylamines). As a result of the volatility of organic amines, these materials have the properties necessary to migrate into dry mortar or concrete. No information is available, however, regarding the ability of these materials to migrate into wet concrete.

In some instances, the possibility of using vanadium in corrosion inhibiting formulations has been addressed in publications. For example, in U.S. Pat. No. 6,048,413 (Park, et al.) a corrosion resistant duplex stainless steel having an austenite ferrite duplex phase matrix is disclosed. In this case, the stainless steel contains a lower content of nickel and exhibits a higher resistance to stress corrosion cracking and pitting in environments containing chloride ions. The stainless steel is comprised of 20–30% chromium, 3–9% nickel, 3–8% molybdenum, 0.20% or less carbon, 0.20–0.50% nitrogen and the balance of iron. This stainless steel may also include at least one element selected from the group of 1.5% or less titanium, 3% or less tungsten, and 2% or less vanadium.

As an example of vanadium being contained within a pigment, U.S. Pat. No. 5,037,478 (Okai, et al.) discloses a corrosion preventive pigment consisting essentially of a phosphorus compound (phosphorus pentoxide, orthophosphoric acid, condensed phosphoric acid, alkaline earth metal or transition metal phosphate, or alkaline earth metal or transition metal condensed phosphate) and a vanadium compound which generates a vanadate ion in the presence of water and oxygen (vanadium oxide, vanadyl compound, an alkaline earth metal or transition metal vanadate, a baked condensate of alkaline earth metal or transition metal vanadates, or a heterocondensate of alkaline earth metal or transition metal vanadates).

Vanadium has also been mentioned as an ingredient in corrosion inhibiting systems for gas conditioning solutions. For example, U.S. Pat. No. 4,372,873 (Nieh) discloses a corrosion inhibited composition consisting essentially of an aqueous alkanolamine, an anion containing vanadium in the stage of oxidation +4 or +5 having a concentration of at least 100 ppm, and an amine co-inhibitor having a concentration in the composition of at least 0.4% (by weight) selected from the group consisting of methyliminobispropylamine and lower alkyl, N-hydroxyalkyl substituted derivatives where lower alkyl has 1 to 4 carbon atoms.

Vanadium has also been mentioned as an ingredient in chromate-free coating mixtures and coatings formed from these mixtures that protect an underlying aluminum or aluminum alloy substrate from corrosion. The use of vanadium salts as components of the chromate-free coating mixtures is disclosed in U.S. Pat. No. 6,077,885 (Hager, et al.). The coating mixtures contain vanadate salts of alkali and alkali earth metals, such as sodium and calcium metavanadate. The corrosion inhibiting coatings disclosed in this patent not only provide protection for aluminum and its alloys against corrosion, but the coatings also have a "site blocking", or "buffering" action, in that the inhibitors of the coatings are, to some extent, mobile and migrate into damaged areas of the aluminum and/or alloy to protect the damaged area from corrosion. This mobility is the result of the solubility of the corrosion inhibitors in the polymer matrix of the coating.

In view of the possibility that the use of vanadium as an active ingredient in a steel repassivator for corroded steel reinforcing rods in chloride contaminated reinforced concrete structures might produce an improved repassivator, it has become desirable to investigate whether vanadium is a proper ingredient in such a repassivator and, if so, to develop a repassivator containing vanadium.

SUMMARY OF THE INVENTION

The present invention provides a new active steel repassivator for the rehabilitation of chloride contaminated reinforced concrete structures and a method to accomplish such rehabilitation. The new active steel repassivator is comprised of a continuous phase, a distributed phase, and/or an aqueous solution of an amine. The continuous phase, also known as the carrier phase, is selected from organic strong volatile bases (cyclohexylamine, dicyclohexylamine, guanidine), salts of weak volatile acids (benzoic esters, butyl cinnamates, nitrobenzoates, alkaline or earth alkaline metal benzoates, or carboxylates), cycloamide hydroxysubstituted, and a non-ionic surfactant with either polyether or polyhydroxyl as a polar group, 75–99%, by weight. The distributed phase includes an anion containing vanadium in the +4 or +5 state of oxidation and having a concentration in the composition of 100–300 ppm. The aqueous solution of an amine co-inhibitor has a concentration in the composition of at least 25% by weight, selected from the group consisting of triethylenetetramine, ethylenediamine, propylenediamine, piperazine, N-amiothylpiperazine. By applying the aforementioned active steel repassivator directly to the surface of the chloride contaminated reinforced concrete, the active steel repassivator penetrates, migrates and contacts the surface of the corroded steel reinforcing rods within the concrete. Electrochemically, the active steel repassivator of the present invention shifts the corrosion potential of the steel reinforcing rods from the active corrosion state to the passive state. To keep the rehabilitated steel reinforcing rods in the passive state, a sealer or polymer coating can be applied to the surface of the reinforced concrete.

DESCRIPTION OF THE PREFERRED EMBODIMENT

Figure 1:
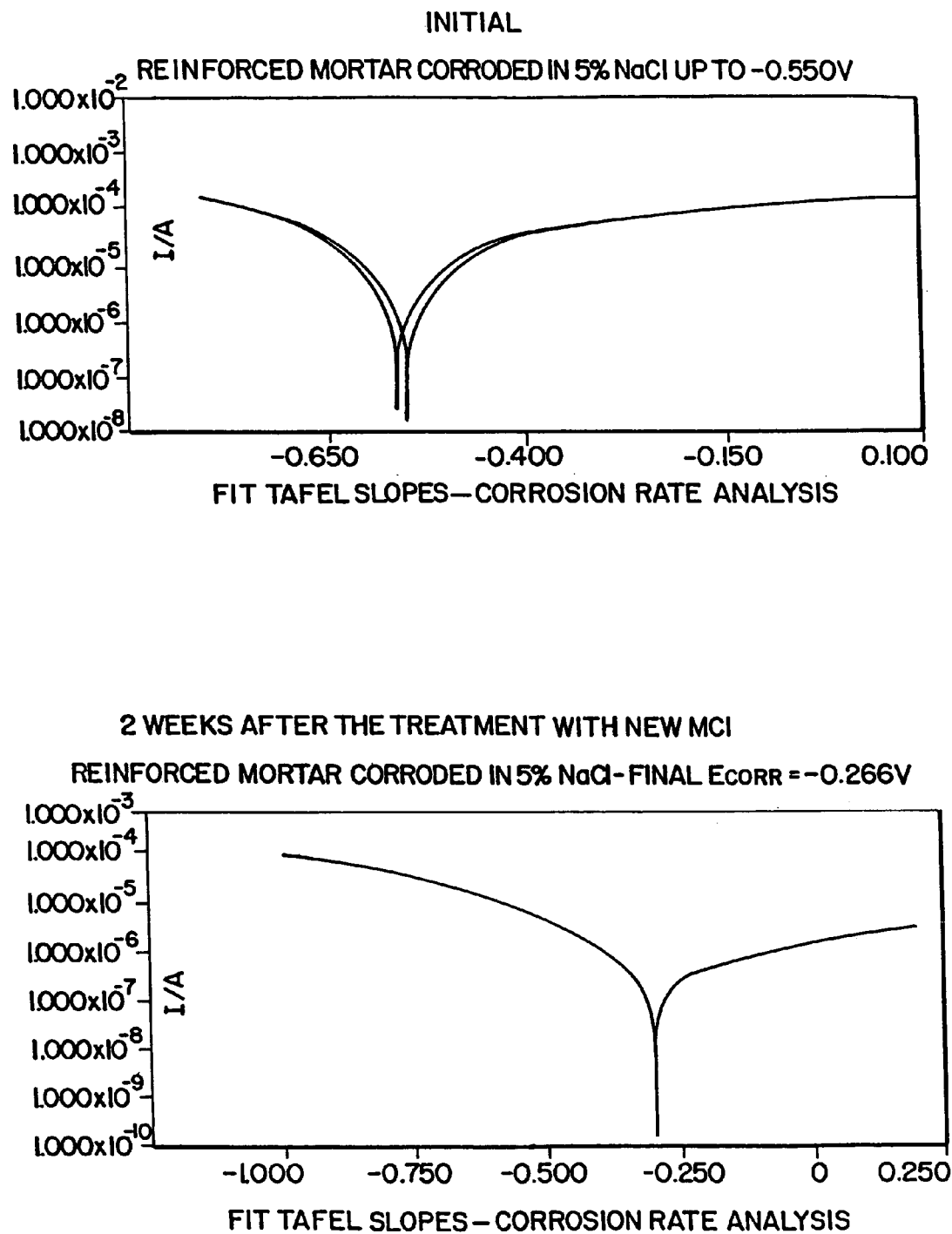
FIG. 1 includes graphs illustrating the effects of rehabilitation on the steel reinforcing material expressed by Tafel diagrams from the Fit Tafel Slopes electrochemical method.

The present invention provides a method for rehabilitating chloride contaminated reinforced concrete structures and a new class of materials, an active steel repassivator, to accomplish same. The method consists of the application of the materials on the surface of the chloride contaminated reinforced concrete. The application is accomplished by a wrapping procedure. The surface of the concrete is kept wet until the active steel repassivator penetrates, migrates and contacts the surface of the corroded steel reinforcing rods within the concrete. Electrochemically, the material modifies the state of the steel reinforcing rods from the active corrosion state to a passive state. To keep the rehabilitated steel reinforcing rods in the passive state, a sealer or polymer coating can be applied to the surface of the reinforced concrete.

The class of materials utilized as active steel repassivators for corroded steel reinforcing rods in chloride contaminated concrete structures contains liquid components of an organic and an inorganic nature. Typically, the active steel repassivator consists of a continuous phase, a distributed phase which may include an aqueous solution of an amine. The continuous phase, also known as the carrier phase, is selected from organic strong volatile bases (cyclohexylamine, dicyclohexylamine, guanidine), salts of weak volatile acids (benzoic esters, butyl cinnamates, nitrobenzoates, alkaline or earth alkaline metal benzoates, or carboxylates), cycloamide hydroxysubstituted, and a non-ionic surfactant with either polyether or polyhydroxyl as a polar group, 75–99%, by weight. The distributed phase includes an anion containing vanadium in the +4 or +5 state of oxidation and having a concentration in the composition of 100 to 300 ppm. The aqueous solution of an amine co-inhibitor has a concentration in the composition of at least 25%, selected from the group consisting of triethylenetetramine, ethylenediamine, propylenediamine, piperazine and N-aminoethylpiperzine.

As an approach to rehabilitate corroded steel reinforcing rods in reinforced concrete, the method of the present invention can be classified as both a physical and an electrochemical approach. The method is physical in nature because it involves the penetration and migration of the active steel repassivator into and through the chloride contaminated concrete to the surface of the corroded steel reinforcing rods within the concrete. The method is electrochemical in nature because it shifts the corrosion potential of the steel reinforcing bars from the active corrosion state to the passive state, and reduces the corrosion rate below a threshold of $1.1 \times 10^{-3}$ mm/year.

The following example illustrates the method utilized to rehabilitate steel reinforced concrete and some of the compositions of the active steel repassivators of the present invention. In this example, chloride contaminated steel reinforced mortar was used. The mortar composition was in accordance with ASTM C 109. The composition of the steel reinforcing rods corresponded to ASTM A 615-Number 4 (0.5 inch). The mortar cover was 0.75 inch. Chloride contamination was accomplished by immersing the mortar specimen in a 5% NaCl water solution. The degree of contamination, i.e., the steel reinforcing rod with active corrosion was $E_{corr} = 0.544v$; $CR = 2.56 \times 10^{-2}$ mm/year.

The active steel repassivator was comprised of the following:

| | |
|---|---|
| Cyclohexylamine (water solution) + Ethoxylated castor oil | 99% |
| Ammonium methavanadate | 1% |
| | 100% |

The method utilized in this example was as follows:
1) Wetting a special paper (with high adsorptive qualities) with the active steel repassivator. The wetting has to be done in excess;
2) Applying the wet paper on the chloride contaminated steel reinforced mortar specimen by wrapping the paper around the specimen;
3) Waiting 70 minutes and measuring the primary electrochemical parameters of the specimen;
4) Waiting up to 120 minutes and again measuring the primary electrochemical parameters of the specimen;
5) Evaluating the state of the steel reinforcing material within the mortar specimen;
6) Determining the thermodynamic stability of the steel reinforcing material if the mortar should again become chloride contaminated. The foregoing is accomplished by immersing the specimen in a 5% NaCi water solution and the electrochemical parameters of the specimen are monitored every 24 hours;
7) Determining the thermodynamic stability of the steel reinforcing material and its electrochemical passivity for 14 days after the source of the contamination has been withdrawn; and
8) Increasing the security of the rehabilitated reinforced concrete structure by applying one or two layers of sealer or polymer coating thereto.

The following table contains the results of the electrochemical measurements obtained during the foregoing test.

The effects of the rehabbilitation on the steel reinforceing material within the concrete, expressed by Tafel diagrams from Fit Tafel slopes electrochemical method is illustrated in FIG. 1.

The corrosion potenyial $E_{corr}$ is generated by the intersection of the cathodic with the anodic branch of the diagram illustrated in FIG.1 measured initially (during the evaluation step) and two weeks after the rehabilitation was performed causes the steel to revert to the passive state. Thus, the meethod of the preasent invention and the materials utilized shifts the corrosion potential from the active state to passive state and reduces the corrosion potential from the active state to the passive state and reduces the corrosion below a threshold of $-0.192V$ ($<-0.2V$ = pasive state).

The penetration of the active steel repassivator into the chloride contaminated reinforced mortar is shown in Table 2.

TABLE 2

The penetration of the active steel repassivator into the chloride contaminated reinforced mortar (composition according to ASTM C 109)

| Penetration, into mortar with a microstructure according to ASTM c 109–98, mm | Minimum depth, mm | Maximum depth, mm |
|---|---|---|
| 1 day | 6 | 8 |
| 3 days | 16 | 20 |
| 4 days | 32 | 40 |
| 7 days | 34 | 45 |
| 10 days | 39 | 56 |

Figure 2:
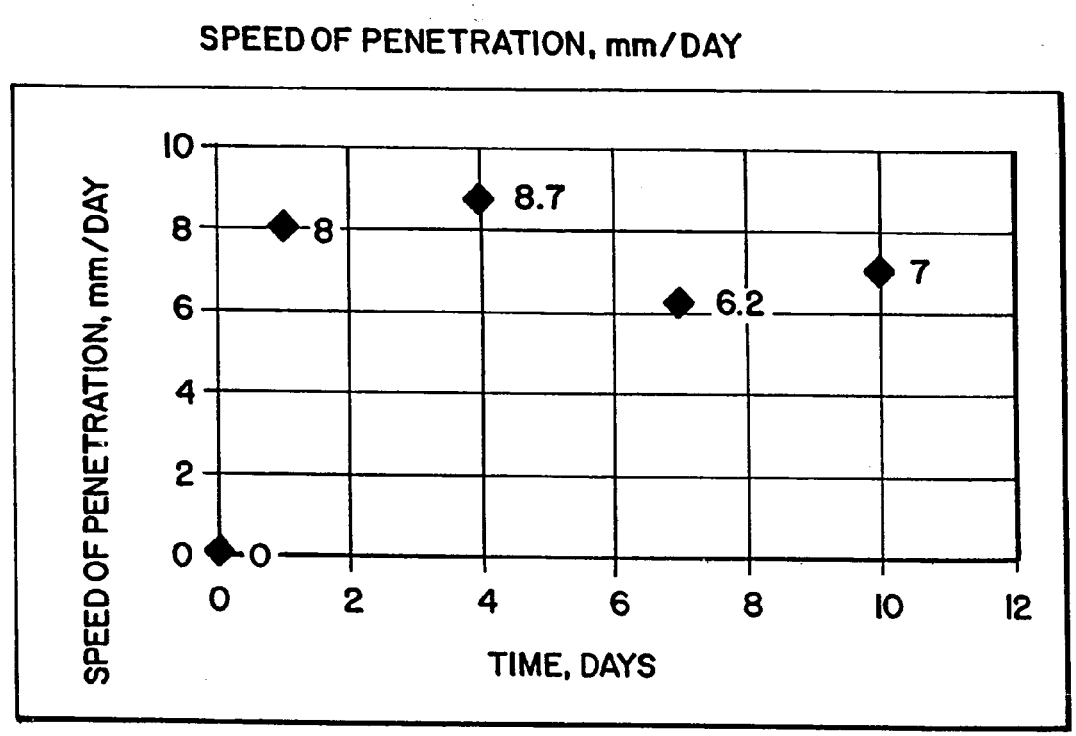
FIG. 2 is a graph illustrating the speed of penetration of the active steel repassivator of the present invention into chloride contaminated reinforced mortar.

The speed of penetration of the active steel repassivator into the chloride contaminated reinforced mortar is shown in FIG. 2.

Certain modifications and improvements will occur to those skilled in the art upon reading the foregoing. It is understood that all such modifications and improvements have been deleted herein for the sake of conciseness and readability but are properly within the scope of the following claims.

We claim:

1. A method for rehabilitating chloride contaminated reinforced concrete by utilizing a migrating corrosion inhibitor composition comprising a carrier phase selected from organic strong volatile bases or salts of weak volatile acids and a non-ionic surfactant, and a distributed phase that includes an anion containing vanadium in the +4 or +5 state

TABLE 1

Electrochemical evaluation of the active steel repassivator and the applied technology

| Electro-chemic. Method | Electro-chemic. parameter | Initial Evaluation | Active Steel Repassivator applied 70 minutes | Active Steel Repassivator applied 120 minutes | 24 hours introduced in 5% NaCl | 48 hours introduced in 5% NaCl | After 8 days in air-Lab. Conditions | After 14 days in air-Lab. Conditions | After sealer application |
|---|---|---|---|---|---|---|---|---|---|
| Linear Polarization | $E_{corr}$, V | −0.544 | −0.399 | −0.182 | −0.322 | −0.331 | −0.209 | −0.266 | −0.205 |
| | $R_p$, Ω | $2.9 \times 10^3$ | $1.5 \times 10^4$ | $3.9 \times 10^4$ | $26 \times 10^3$ | $63 \times 10^3$ | $87 \times 10^3$ | $8.3 \times 10^4$ | — |
| Fit Tafel Slopes | $I_{corr}$, A | $3.3 \times 10^{-5}$ | $8.8 \times 10^{-6}$ | $4.0 \times 10^{-8}$ | $4.9 \times 10^{-6}$ | $9.8 \times 10^{-7}$ | $1.9 \times 10^{-8}$ | $4.9 \times 10^{-7}$ | — |
| | $I_{corr}$, A/cm² | $2.2 \times 10^{-6}$ | $5.9 \times 10^{-7}$ | $2.7 \times 10^{-9}$ | $6.2 \times 10^{-7}$ | $1.2 \times 10^{-7}$ | $2.4 \times 10^{-9}$ | $4.2 \times 10^{-9}$ | — |
| | CR, Mm/yr. | $2.5 \times 10^{-2}$ | $6.8 \times 10^{-3}$ | $3.1 \times 10^{-5}$ | $7.2 \times 10^{-3}$ | $1.4 \times 10^{-3}$ | $2.8 \times 10^{-4}$ | $4.8 \times 10^{-4}$ | — | of oxidation and having a concentration in the composition of 100–300 ppm, said method comprising the step of wetting the concrete with said migrating corrosion inhibitor.

2. The method as defined in claim 1 further including, after the step of wetting the concrete with said migrating corrosion inhibitor, the step of measuring the primary electrochemical parameters of the concrete after a first pre-determined period of time.

3. The method as defined in claim 2 further including, after the step of measuring the primary electrochemical parameters after a first pre-determined period of time, the step of determining the thermodynamic stability of the concrete by immersing a specimen of the concrete in a NaCl water solution and measuring the primary electrochemical parameters of the concrete after the NaCl water solution has been withdrawn.

4. The method as defined in claim 3 further including, after the step of determining the thermodynamic stability of the concrete by immersing a specimen of the concrete in a NaCl water solution and measuring the primary electrochemical parameters of the concrete after the NaCl water solution has been withdrawn, the step of applying at least one layer of a sealer or polymer coating to the concrete to increase the resistance thereof to chloride contamination.

5. The method as defined in claim 1 wherein said distributed phase in said corrosion inhibitor composition further includes an aqueous solution of an amine co-inhibitor having a concentration in said composition of at least 25% by weight of said composition and selected from the group consisting of triethylenetetramine, ethylenediamine, propylenediamine, piperazine and N-aminoethylpiperazine.

* * * * *